United States Patent
Kasahara et al.

(10) Patent No.: US 11,112,324 B2
(45) Date of Patent: Sep. 7, 2021

(54) PRESSURE SENSOR HAVING A HEAT RECEIVER INCLUDING A FIRST PORTION AND A SECOND PORTION

(71) Applicant: NGK SPARK PLUG CO., LTD., Nagoya (JP)

(72) Inventors: Daisuke Kasahara, Nagoya (JP); Hirotaka Saito, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 88 days.

(21) Appl. No.: 16/622,319

(22) PCT Filed: Oct. 25, 2018

(86) PCT No.: PCT/JP2018/039631
§ 371 (c)(1),
(2) Date: Dec. 13, 2019

(87) PCT Pub. No.: WO2019/102781
PCT Pub. Date: May 31, 2019

(65) Prior Publication Data
US 2021/0148774 A1     May 20, 2021

(30) Foreign Application Priority Data

Nov. 21, 2017    (JP) .............................. JP2017-224025

(51) Int. Cl.
*G01L 9/00*      (2006.01)
*G01L 23/18*     (2006.01)
(Continued)

(52) U.S. Cl.
CPC ............ *G01L 9/008* (2013.01); *G01L 9/0051* (2013.01); *G01L 19/14* (2013.01); *G01L 23/10* (2013.01); *G01L 23/18* (2013.01)

(58) Field of Classification Search
None
See application file for complete search history.

(56) References Cited

U.S. PATENT DOCUMENTS 5,488,868 A     2/1996   Ootake et al.
2016/0299024 A1*   10/2016   Yamada ................. G01L 7/082
(Continued)

FOREIGN PATENT DOCUMENTS

CN       107063560 A     8/2017
JP        07-19981 A     1/1995
(Continued)

OTHER PUBLICATIONS

Communication dated Feb. 3, 2021 by the China National Intellectual Property Administration in application No. 201880050123.2.
(Continued)

*Primary Examiner* — Peter J Macchiarolo
*Assistant Examiner* — Jermaine L Jenkins
(74) *Attorney, Agent, or Firm* — Sughrue Mion, PLLC

(57) ABSTRACT

A pressure sensor includes: a housing having a tubular shape, and including a front end including an opening; a diaphragm that is disposed to close the opening, and is structured to deform depending on a pressure exerted on a front side of the diaphragm, and includes a hole extending rearwardly from a front end face of the diaphragm; a sensor element structured to output a signal varying depending on an amount of the deformation of the diaphragm; and a heat receiver including a first portion and a second portion. The first portion is disposed in the hole of the diaphragm, and is joined with an inner periphery of the diaphragm defining the hole. The second portion is formed integrally with the first portion, and is disposed adjacent to a front end of the first portion, and is structured to cover the front end face of the diaphragm.

4 Claims, 2 Drawing Sheets

(51) Int. Cl.
*G01L 23/10* (2006.01)
*G01L 19/14* (2006.01)

(56) References Cited

U.S. PATENT DOCUMENTS

2017/0343437 A1* 11/2017 Ura .................... G01L 19/146
2018/0202886 A1*  7/2018 Yamada ............... F02B 77/085
2020/0200636 A1*  6/2020 Fuji .................... G01L 19/0681

FOREIGN PATENT DOCUMENTS

JP    2017-040516 A    2/2017
WO    2017/010416 A1   1/2017

OTHER PUBLICATIONS

International Search Report for PCT/JP2018/039631 dated Jan. 22, 2019 [PCT/ISA/210].

* cited by examiner

PRESSURE SENSOR HAVING A HEAT RECEIVER INCLUDING A FIRST PORTION AND A SECOND PORTION

CROSS REFERENCE TO RELATED APPLICATIONS

This application is a National Stage of International Application No. PCT/JP2018/039631, filed Oct. 25, 2018, claiming priority to Japanese Patent Application No. 2017-224025, filed Nov. 21, 2017.

TECHNICAL FIELD

The present disclosure relates to a pressure sensor for measurement of pressure in a combustion chamber of an internal combustion engine.

BACKGROUND ART

There is a known pressure sensor including: a tubular housing that opens at its front end; a diaphragm is structured to close the opening of the housing and deform depending on a pressure exerted on a front end side of the diaphragm due to combustion gas; and a sensor element configured to output a signal varying depending on an amount of the deformation of the diaphragm. Furthermore, there is another known pressure sensor including a diaphragm and a heat receiver disposed at a front end face of the diaphragm in order to reduce an amount of thermal deformation of the diaphragm due to combustion gas having a high temperature.

PRIOR ART DOCUMENT(S)

Patent Document(s)

Patent Document 1: JP H07-19981 A
Patent Document 2: JP 2017-40516 A

SUMMARY OF THE INVENTION

Problem(s) to be Solved by the Invention

However, the known pressure sensor is insufficient in consideration for joining between the heat receiver and the diaphragm, and has a problem that the heat receiver may fall off from the diaphragm during use in an internal combustion engine.

In view of the foregoing, it is desirable to provide an art that improves the joint between the heat receiver and the diaphragm and suppresses the heat receiver from falling off from the diaphragm.

Means for Solving the Problem(s)

The present disclosure may be applied as follows for example.

[Example 1] A pressure sensor includes: a housing having a tubular shape that opens at a front end of the housing; a diaphragm that is disposed to close the opening of the housing, and is structured to deform depending on a pressure exerted on a front side of the diaphragm, and includes a hole extending rearwardly from a front end face of the diaphragm; a sensor element configured to output a signal varying depending on an amount of the deformation of the diaphragm; and a heat receiver including a first portion and a second portion, wherein: the first portion of the heat receiver is disposed in the hole of the diaphragm, and is joined with an inner periphery of the diaphragm defining the hole of the diaphragm; and the second portion of the heat receiver is formed integrally with the first portion, and is disposed adjacent to a front end of the first portion, and is structured to cover the front end face of the diaphragm at least partially.

This configuration serves to prevent the first portion and the second portion of the heat receiver from parting from each other, because the first portion and the second portion are not joined by welding etc. but are integrally formed. The configuration further serves to suppress a joint between the heat receiver and the diaphragm from being exposed to combustion gas, because the first portion of the heat receiver is joined with the inner periphery of the diaphragm defining the hole of the diaphragm extending rearwardly from the front end face of the diaphragm. This serves to suppress the combustion gas from affecting the joint between the heat receiver and the diaphragm and deteriorating or damaging the joint, and thereby suppress the heat receiver from falling off from the diaphragm.

[Example 2] The pressure sensor according to Example 1, wherein: the diaphragm further includes a rear end disposed in the housing; the hole of the diaphragm includes a hole rear end in the rear end of the diaphragm; and the first portion of the heat receiver is joined with the inner periphery of the diaphragm in the hole rear end.

This configuration serves to bring the joint between the heat receiver and the diaphragm apart from the front end face of the diaphragm, because the hole of the diaphragm includes the hole rear end in the rear end of the diaphragm disposed in the housing, and the heat receiver is joined with the inner periphery of the diaphragm in the hole rear end. This serves to further suppress the combustion gas from affecting the joint between the heat receiver and the diaphragm and deteriorating or damaging the joint, and thereby further suppress the heat receiver from falling off from the diaphragm.

[Example 3] The pressure sensor according to Example 1 or 2, wherein: the diaphragm further includes a rod portion and a flange portion; the rod portion of the diaphragm extends rearwardly from a front end of the diaphragm; the flange portion of the diaphragm expands from a periphery of the rod portion outwardly in a radial direction, and is structured to deform depending on a pressure exerted on a front side of the flange portion; the second portion of the heat receiver is structured to cover the front end face of the diaphragm in the flange portion at least partially; the hole of the diaphragm is formed in the rod portion, and extends from the front end face of the diaphragm in the rod portion rearwardly past a rear end face of the flange portion; and the first portion of the heat receiver is joined with the inner periphery of the diaphragm in a rear part of the hole with respect to the rear end face of the flange portion.

This configuration further serves to bring the joint between the heat receiver and the diaphragm apart from the front end face of the diaphragm, because the heat receiver is joined with the inner periphery of the diaphragm in the rear part of the hole of the diaphragm with respect to the rear end face of the flange portion. This serves to further suppress the combustion gas from affecting the joint between the heat receiver and the diaphragm and deteriorating or damaging the joint, and thereby further suppress the heat receiver from falling off from the diaphragm.

[Example 4] The pressure sensor according to any one of Examples 1 to 3, wherein: the diaphragm is joined with the front end of the housing via a joint; the front end face of the diaphragm and the joint have an orthogonal projection on a plane parallel with the front end face of the diaphragm; and the orthogonal projection satisfies a condition of 0.15≤(Sn/Sd)≤0.25, where: Sd represents an area enclosed with the joint in the orthogonal projection; and Sn represents an aperture area of the hole of the diaphragm in the orthogonal projection.

This configuration serves to suppress the ratio of the aperture area Sn of the hole with respect to the enclosure area Sd of the joint from excessing a level, and suppress the deformation (or warp) of the diaphragm from being reduced, and thereby facilitate precise measurement of pressure in a combustion chamber.

The configuration further serves to ensure a sufficient region for the joint between the heat receiver and the diaphragm, because the ratio of the aperture area Sn to the enclosure area Sd is not excessively small. This serves to reduce a load exerted on the joint between the heat receiver and the diaphragm, and thereby further suppress the heat receiver from falling off from the diaphragm.

The art according to the present disclosure may be implemented in various modes such as a pressure sensor and an internal combustion engine including the pressure sensor.

MODE(S) FOR CARRYING OUT THE INVENTION

Figure 1:
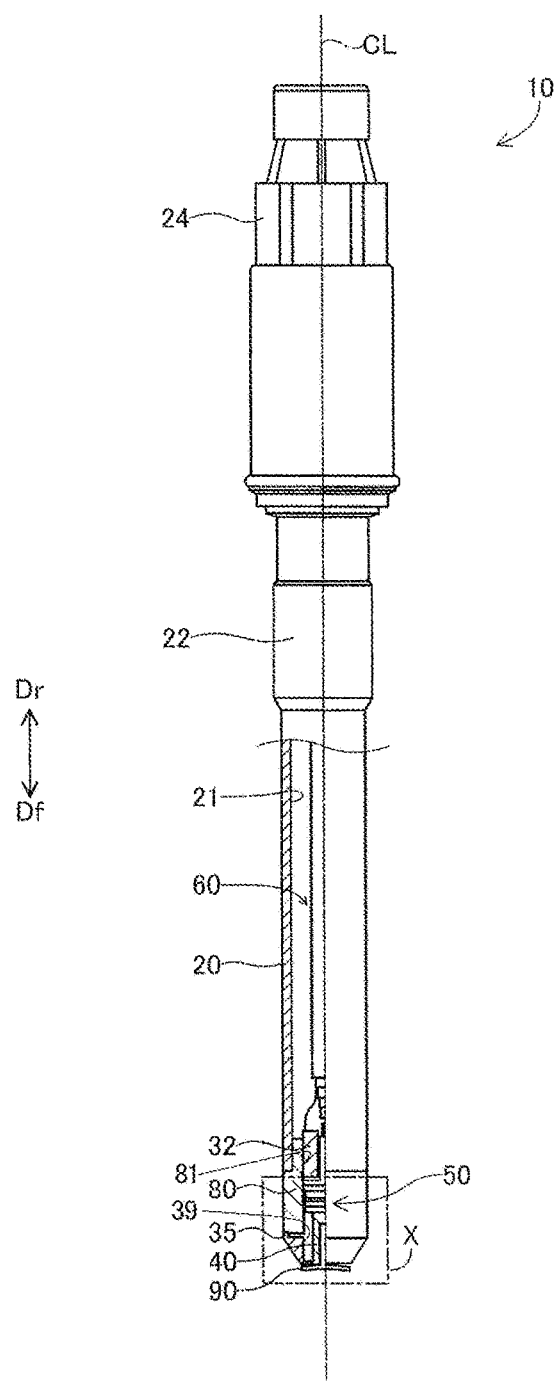
FIG. 1 is an illustrative view of a pressure sensor 10 according to a first embodiment of the present disclosure.

A. First Embodiment FIG. 1 shows the pressure sensor 10 according to the first embodiment of the present disclosure. The pressure sensor 10 is to be mounted to an internal combustion engine for measurement of pressure in a combustion chamber of the internal combustion engine. As shown in FIG. 1, the pressure sensor 10 includes as main components a first metal shell 20, a second metal shell 80, a third metal shell 35, a diaphragm 40, a heat receiver 90, an element section 50, and a cable 60. Each of the first metal shell 20, the second metal shell 80, and the third metal shell 35 has a tubular shape. The pressure sensor 10 has a central axis CL that is also simply referred to as axis CL. In the following description, "axial direction" indicates a direction parallel with the axis CL, and "radial direction" indicates a radial direction of a circle around the axis CL, and "circumferential direction" indicates a circumferential direction of the circle around the axis CL. Furthermore, "frontward direction Df" indicates a direction from the first metal shell 20 toward the diaphragm 40 along the axis CL, and "rearward direction Dr" indicates a direction opposite to the frontward direction Df.

"Frontward" or "front" is based on the frontward direction Df, and "rearward" or "rear" is based on the rearward direction Dr.

FIG. 1 shows a longitudinal section of a front half of the pressure sensor 10 in a left side with respect to the axis CL. This longitudinal section is a section at a plane including the axis CL. FIG. 1 also shows a whole appearance of the pressure sensor 10. The central axis CL of the pressure sensor 10 is also a central axis of each of the first metal shell 20, the second metal shell 80, the third metal shell 35, the diaphragm 40, the heat receiver 90, and the element section 50.

Each of the first metal shell 20, the second metal shell 80, and the third metal shell 35 has the tubular shape that extends in the axial direction and appears annular at a cross section perpendicular to the axis CL. The first metal shell 20, the second metal shell 80, and the third metal shell 35 according to the present embodiment are made of stainless steel although they may be made of other material including steel such as low carbon steel and various metals. The first metal shell 20, the second metal shell 80, and the third metal shell 35 compose a tubular member corresponding to "housing" in the claims.

The first metal shell 20 includes an axial hole 21 that is a through hole centered at the axis CL. The first metal shell 20 further includes a screw portion 22 and a tool engagement portion 24 in an outer periphery of a rear part of the first metal shell 20. The screw portion 22 has a thread groove for mounting the pressure sensor 10 to a cylinder head of the internal combustion engine. The tool engagement portion 24 is shaped to engage with a tool (not shown) for mounting and dismounting of the pressure sensor 10, and has a hexagonal cross section for example.

The second metal shell 80 includes an axial hole 81 that is a through hole centered at the axis CL. The third metal shell 35 includes an axial hole 39 that is a through hole centered at the axis CL. The axial hole 21 of the first metal shell 20, the axial hole 81 of the second metal shell 80, and the axial hole 39 of the third metal shell 35 form a continuous through hole communicating with the axial hole 21 of the first metal shell 20. The axial hole 81 of the second metal shell 80 contains the element section 50 and a presser screw 32 in this order in the rearward direction. The axial hole 39 of the third metal shell 35 contains the diaphragm 40.

Figure 2:
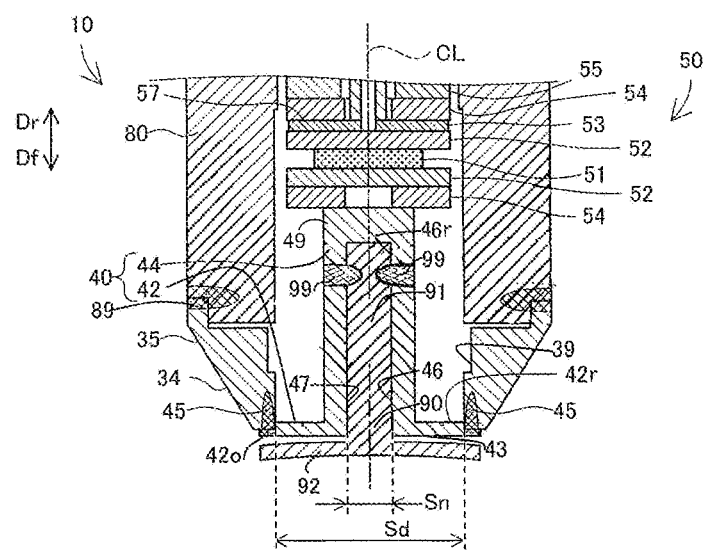
FIG. 2 is a longitudinal sectional view of the pressure sensor 10 which enlarges a front end of the pressure sensor 10.

FIG. 2 is a longitudinal sectional view of the pressure sensor 10 enlarging a front end of the pressure sensor 10: specifically, enlarging a region X shown in FIG. 1. This longitudinal section is a section at a plane including the axis CL. The third metal shell 35 is joined to a front end of the second metal shell 80 via a joint 89. The joint 89 is a weld formed in welding (such as laser welding) of the third metal shell 35 and the second metal shell 80, and is also referred to as weld part 89 or weld mark 89. The third metal shell 35 includes at its front end a diameter-expanding portion 34 in which its diameter becomes greater as going rearwardly. The diameter-expanding portion 34 is structured to fit with the cylinder head of the internal combustion engine when the pressure sensor 10 is mounted to the internal combustion engine.

The diaphragm 40 includes a rod portion 44 and a flange portion 42. The rod portion 44 is a cylindrical tubular portion that is centered at the axis CL and extends in the rearward direction Dr.

The flange portion 42 is a substantially circular membrane-like member expanding from a periphery of the rod portion 44 outwardly in the radial direction. The flange portion 42 includes in its circumference a rim 420 that is entirely joined to the front end of the third metal shell 35 via a joint 45 by laser welding etc. The diaphragm 40 is disposed to close an opening at a front end of the tubular housing: i.e., an opening at the front end of the third metal shell 35 having the axial hole 39.

The flange portion 42 and the rod portion 44 are integrally formed and made of stainless steel by forging or shaving. In another way, the flange portion 42 and the rod portion 44 may be separately formed and subsequently integrated by welding etc. In addition, the flange portion 42 and the rod portion 44 may be made of material other than stainless steel which includes steel such as low carbon steel and various metals.

The diaphragm 40 includes a front end face 43 disposed to be exposed to combustion gas. The flange portion 42 of the diaphragm 40 is structured to warp (deform) depending on a pressure in the combustion chamber exerted on a front side of the flange portion 42. The rod portion 44 is structured to be displaced substantially parallel with the axis CL, depending on the warp (the deformation) of the flange portion 42. This allows the rod portion 44 to transmit a load depending on the pressure Pc to the element section 50 (described below) joined with a rear end of the rod portion 44.

The diaphragm 40 further includes: a hole 46 extending rearwardly from the front end face 43 of the diaphragm 40; and an inner periphery 47 defining the hole 46. The diaphragm 40 is joined with the heat receiver 90 described below, via the inner periphery 47. The inner periphery 47 includes a bottom surface and a side surface defining the hole 46.

According to the present embodiment, the diaphragm 40 includes a rear end disposed in the housing (specifically, the third metal shell 35). The hole 46 includes a hole rear end 46r disposed at the rear end of the diaphragm 40. The above expression of "in the housing (specifically, the third metal shell 35)" means being in a space defined as in a rear side with respect to the front end of the housing (specifically, the third metal shell 35) and as surrounded by the housing in the radial direction. The heat receiver 90 is joined with the inner periphery 47 of the diaphragm 40 in the hole rear end 46r.

The heat receiver 90 includes: a first portion 91 that has a shape of rod and is disposed in the hole 46 of the diaphragm 40; and a second portion 92 that has a shape of circular plate centered at the axis CL and is disposed adjacent to the first portion 91. The heat receiver 90 according to the present embodiment is made of stainless steel although it may be made of other metal. The first portion 91 and the second portion 92 are integrally formed by forging or shaving.

As viewed in the rearward direction Dr the pressure sensor 10 appears that the second portion 92 of the heat receiver 90 covers at least partially the front end face 43 of the diaphragm 40: i.e., the front end face 43 of the flange portion 42. According to the present embodiment, the front end face 43 of the flange portion 42 is substantially entirely covered by the second portion 92 of the heat receiver 90.

The first portion 91 of the heat receiver 90 is joined with the inner periphery 47 of the diaphragm 40 in the hole rear end 46r of the hole 46 of the diaphragm 40, via a joint 99 by laser welding etc. The joint 99 is formed in the hole rear end 46r of the hole 46.

According to the present embodiment, the hole 46 of the diaphragm 40 is formed in the rod portion 44, and extends from the front end face 43 of the rod portion 44 rearwardly past a rear end face 42r of the flange portion 42. The first portion 91 of the heat receiver 90 is joined with the inner periphery 47 of the diaphragm 40 in a rear part of the hole 46 with respect to the rear end face 42r of the flange portion 42.

The presser screw 32 (see FIG. 1) is disposed in a rear part of the axial hole of the second metal shell 80. The presser screw 32 includes: an axial hole that is a through hole centered at the axis CL; and an external screw formed in an outer periphery of the presser screw 32. The second metal shell 80 includes an internal screw to engage with the external screw of the presser screw 32, in an inner periphery of the second metal shell 80 in the rear part of the axial hole of the second metal shell 80. The presser screw 32 is structured to be screwed into the axial hole of the second metal shell 80 from a rear end of the second metal shell 80. The presser screw 32 and the rod portion 44 of the diaphragm 40 interpose the element section 50 therebetween. The presser screw 32 is structured to exert a preload on the element section 50. The preload is easily regulated by adjusting a number of rotation of the presser screw 32 upon screwing the presser screw 32 into the second metal shell 80. This serves to improve the measurement of pressure in precision. The presser screw 32 is made of stainless steel although it may be made of other material including steel such as low carbon steel and various metals.

The element section 50 includes: a pair of electrodes 52; a sensor element 51 that is a piezoelectric element according to the present embodiment, and is interposed between the pair of electrodes 52; a hold plate 54 disposed at a front side of a front one of the electrodes 52; and a lead 53, another hold plate 54, and an insulator plate 55 which are disposed in this order in the rearward direction Dr at a rear side of a rear one of the electrodes 52. As shown in FIG. 2, the hold plate 54, the electrode 52, the sensor element 51, the electrode 52, the hold plate 54, and the insulator plate 55 are stacked in this order rearwardly. The insulator plate 55 has a rear end face supported by a front end face of the presser screw 32. The rear end 49 of the rod portion 44 is in contact with a front end face of the front one of the hold plates 54. The sensor element 51 is connected to the rod portion 44 via the front one of the electrodes 52 and the front one of the hold plates 54. The sensor element 51 is configured to output a signal varying depending on an amount of the warp of the diaphragm 40: in detail, the warp of the flange portion 42. The sensor element 51 may be a sensor element other than the piezoelectric element, such as a strain gauge type element.

Thus, the pressure sensor 10 according to the first embodiment serves to prevent the first portion 91 and the second portion 92 of the heat receiver 90 from parting from each other, because the first portion 91 and the second portion 92 are not joined with each other by welding etc. but are integrally formed. The pressure sensor 10 further serves to suppress the joint 99 between the diaphragm 40 and the heat receiver 90 from being exposed to the combustion gas, because the first portion 91 of the heat receiver 90 is joined with the inner periphery 47 of the diaphragm 40 defining the hole 46 extending rearwardly from the front end face 43 of the diaphragm 40. This serves to suppress the combustion gas from affecting the joint 99 and deteriorating or damaging the joint 99, and thereby suppress the heat receiver 90 from falling off from the diaphragm 40.

In addition, the pressure sensor 10 according to the first embodiment serves to bring the joint 99 between the diaphragm 40 and the heat receiver 90 farther from the front end face 43 of the diaphragm 40, because the hole 46 of the diaphragm 40 includes the hole rear end 46r in the rear end of the diaphragm 40 disposed in the housing, and the heat receiver 90 is joined with the inner periphery 47 of the diaphragm 40 defining the hole rear end 46r. This serves to further suppress the combustion gas from affecting the joint 99 and deteriorating or damaging the joint 99, and thereby further suppress the heat receiver 90 from falling off from the diaphragm 40.

The pressure sensor 10 according to the first embodiment further serves to bring the joint 99 between the diaphragm 40 and the heat receiver 90 farther from the front end face 43 of the diaphragm 40, because the heat receiver 90 is joined with the inner periphery 47 of the diaphragm 40 in the rear part of the hole 46 with respect to the rear end face 42r of the flange portion 42. This serves to further suppress the combustion gas from affecting the joint 99 and deteriorating or damaging the joint 99, and thereby further suppress the heat receiver 90 from falling off from the diaphragm 40.

B. First Test The following describes a first test made on samples of the pressure sensor 10.

The first test was implemented by: mounting each of the sample sensors and an exemplary sensor to a same cylinder (i.e., a combustion chamber) of an internal combustion engine; starting the internal combustion engine; and obtaining a waveform of pressure from each of the sample sensors and the exemplary sensor.

The sample sensors were samples of the pressure sensor 10 according to the first embodiment which is shown in FIGS. 1 and 2. They were prepared as seven sample sensors different in the ratio Sn/Sd of the aperture area Sn of the hole 46 of the diaphragm 40 to the enclosure area Sd of the joint 45, by adjusting an inner diameter of the hole 46. Each of the sample sensors had a value of Sn/Sd within a range of 0.05 to 0.35.

The internal combustion engine was a naturally aspirated engine with inline four cylinders and a displacement of 1.3 L. The internal combustion engine was operated under an engine speed of 1500 rpm and a throttle valve opening of 10%.

The exemplary pressure sensor had been antecedently regulated to perform the measurement of pressure with sufficient precision. The first test includes steps of: measuring a pressure G2 exerted on each of the sample sensors and a pressure G1 exerted on the exemplary sensor for five cycles; calculating a difference between the pressures G1 and G2 at a same timing; determining a maximum Em of the difference during each cycle; and calculating an average of five maximum differences Em as a pressure error Ep of the each of the sample sensors. Each of the sample sensors was evaluated as ○ (desirable) when the pressure error Ep is less than 200 kPa, and was evaluated as Δ (undesirable) when the pressure error Ep is greater than 200 kPa.

TABLE 1

| Sn/Sd | 0.05 | 0.1 | 0.15 | 0.2 | 0.25 | 0.3 | 0.4 |
|---|---|---|---|---|---|---|---|
| EVALUATION | ○ | ○ | ○ | ○ | ○ | Δ | Δ |

Table 1 shows results of the first test. The sample sensors with the ratios Sn/Sd of 0.3 and 0.4 had the pressure errors Ep greater than 200 kPa, and were evaluated as Δ. On the other hand, the sample sensors with the ratios Sn/Sd of 0.05, 0.10, 0.15, 0.20, and 0.25 had the pressure errors Ep less than 200 kPa, and were evaluated as ○. This is considered to be because: the aperture area Sn of the hole 46 was not excessively large with respect to the enclosure area Sd of the joint 45; the diaphragm 40 was not suppressed from warping (deforming); and the measurement of pressure in the combustion chamber was precisely performed.

C. Second Test The following describes a second test. The second test was implemented by: mounting the sample sensors different in the ratio Sn/Sd of the aperture area Sn of the hole 46 to the enclosure area Sd of the joint 45, to an internal combustion engine; operating the internal combustion engine for hundred hours; and then observing and evaluating the sample sensors. Each of the sample sensors was evaluated as Δ (undesirable) when damaged, and evaluated as ○ (desirable) when undamaged.

The internal combustion engine employed in this durability test was a naturally aspirated engine with inline four cylinders and a displacement of 1.3 L. The internal combustion engine was operated under an engine speed of 6000 rpm and a throttle valve opening of 100%. This is harder operation than the ordinary.

TABLE 2

| Sn/Sd | 0.05 | 0.1 | 0.15 | 0.2 | 0.25 | 0.3 | 0.4 |
|---|---|---|---|---|---|---|---|
| EVALUATION | Δ | Δ | ○ | ○ | ○ | ○ | ○ |

Table 2 shows results of the second test. The sample sensors with the ratios Sn/Sd of 0.05 and 0.10 underwent damage in the heat receiver 90, and evaluated as α. On the other hand, the sample sensors with the ratios Sn/Sd of 0.15, 0.20, 0.25, 0.30, and 0.40 did not undergo damage in the heat receiver 90, and were evaluated as ○. This is considered to be because: the aperture area Sn of the hole was not excessively small with respect to the enclosure area Sd; the diaphragm 40 and the heat receiver 90 have a sufficient region for joint therebetween; the load exerted on the joint 99 between the diaphragm 40 and the heat receiver 90 was reduced; and the heat receiver 90 was further suppressed from falling off from the diaphragm 40.

D. Variations (1) According to the first embodiment, the first portion 91 of the heat receiver 90 is joined with the inner periphery 47 of the diaphragm 40 in the housing: in detail, in the third metal shell. Alternatively, the heat receiver 90 may be joined with the diaphragm 40 in a portion of the diaphragm 40 which is disposed outside of the housing.

(2) According to the first embodiment, the heat receiver 90 is joined with the diaphragm 40 by laser welding. Alternatively, this joint may be formed by other welding such as resistance welding and electron beam welding, or by method other than welding such as press-fitting, caulk-fixing, and bonding by heat-resistant adhesive.

(3) According to the first embodiment, the hole 46 of the diaphragm 40 is formed to open in the rod portion 44 of the diaphragm 40. Alternatively, the hole 46 may be formed in the flange portion 42 of the diaphragm 40.

(4) According to the first embodiment, each of the hole 46 of the diaphragm 40 and the first portion 91 of the heat receiver 90 is one in number. Alternatively, the diaphragm 40 may include a plurality of the holes 46, and the heat receiver 90 may include a plurality of the first portions 91.

The present invention has been described with reference to the embodiment and its variations. The embodiment and its variations are intended to facilitate understanding of the present invention, and are not intended to limit the present invention thereto. Various changes and modifications may be made to the embodiment and its variations without departing from scope of the present invention. The present invention includes equivalents thereof.

The invention claimed is:
1. A pressure sensor comprising:
  a housing having a tubular shape, and including a front end including an opening;
  a diaphragm that is disposed to close the opening of the housing, and is structured to deform depending on a pressure exerted on a front side of the diaphragm, and includes a hole extending rearwardly from a front end face of the diaphragm;

a sensor element structured to output a signal varying depending on an amount of the deformation of the diaphragm; and a heat receiver including a first portion and a second portion, wherein:

the first portion of the heat receiver is disposed in the hole of the diaphragm, and is joined with an inner periphery of the diaphragm defining the hole of the diaphragm; and the second portion of the heat receiver is formed integrally with the first portion, and is disposed adjacent to a front end of the first portion, and is structured to cover the front end face of the diaphragm at least partially.

2. The pressure sensor as claimed in claim 1, wherein:
the diaphragm further includes a rear end disposed in the housing;
the hole of the diaphragm includes a hole rear end at the rear end of the diaphragm; and
the first portion of the heat receiver is joined with the inner periphery of the diaphragm in the hole rear end.

3. The pressure sensor as claimed in claim 1, wherein:
the diaphragm further includes a rod portion and a flange portion;
the rod portion of the diaphragm extends rearwardly from a front end of the diaphragm;
the flange portion of the diaphragm expands from a periphery of the rod portion outwardly in a radial direction, and is structured to deform depending on a pressure exerted on a front side of the flange portion;
the second portion of the heat receiver is structured to cover the front end face of the diaphragm in the flange portion at least partially;
the hole of the diaphragm is formed in the rod portion, and extends from the front end face of the diaphragm in the rod portion rearwardly past a rear end face of the flange portion; and
the first portion of the heat receiver is joined with the inner periphery of the diaphragm in a rear part of the hole with respect to the rear end face of the flange portion.

4. The pressure sensor as claimed in claim 1, wherein:
the diaphragm is joined with the front end of the housing via a joint;
the front end face of the diaphragm and the joint have an orthogonal projection on a plane parallel with the front end face of the diaphragm; and
the orthogonal projection satisfies a condition of $0.15 \leq (Sn/Sd) \leq 0.25$, where: Sd represents an area enclosed with the joint in the orthogonal projection; and Sn represents an aperture area of the hole of the diaphragm in the orthogonal projection.

* * * * *